United States Patent Office 3,826,750
Patented July 30, 1974

3,826,750
NOBLE METALS SOLVATION AGENTS—HYDROXYKETONES AND IODINE AND IODIDE
Harold W. Wilson, El Paso, Tex., assignor to
Golden Cycle Corporation
No Drawing. Original application Jan. 8, 1970, Ser. No. 1,563, now Patent No. 3,709,681. Divided and this application Sept. 25, 1972, Ser. No. 291,636
Int. Cl. C22b 11/04
U.S. Cl. 252—187 R          9 Claims

ABSTRACT OF THE DISCLOSURE

Processes for and compositions utilized in the recovery of noble metals from noble metal containing substances by subjecting such substances—preferably in comminuted form—to the action of a solvent preferably comprising diacetone alcohol as a major component, water, minor amounts of glacial acetic acid, potassium iodide and elemental iodine. Solvation of the noble metal occurs during agitation and heating of the slurry. The noble metal contents are removed from the noble metal pregnant solution by displacement onto a non-noble metal surface. The solid noble metal containing residue is treated with sufficient aqueous hydroxide solution to convert excess non-noble metal into its water-soluble salt. The remaining insoluble material containing the noble metal recovered is rinsed to remove any remaining unreacted alkali and the soluble salts and is then digested with concentrated sulfuric acid to dissolve any remaining acid soluble impurities, the remaining acid insoluble residue is rinsed, dried and comprises substantially pure noble metal.

---

This is a division of application Ser. No. 1,563, filed Jan. 8, 1970, now Pat. No. 3,709,681.

In a prior disclosure contained in application Ser. No. 727,666, filed May 8, 1968, now Pat. 3,576,620, it is proposed to employ a substantially non-aqeuous process for the separation and recovery of noble metals, particularly gold, platinum and the platinum group metals, from materials containing the same. The process comprised subjecting particulate, preferably finely divided, dry material to an iodine-containing ketonic solvent, with heating and agitation of the slurry, to effect the solvation of, and thus separation of, the noble metals and other constituents from the material. It was further proposed that the liquid phase so derived be acidified and heated to effect volatilization of iodine by decomposition of the iodine-noble metal compounds together with attendant liberation i.e. precipitation of elemental noble metals due to the decomposition of organic and inorganic noble metal containing compounds. Alternatively, it was proposed in the above numbered application that the noble metals may be separated and recovered from materials containing the same by first solvating the noble metals with aqua regia to obtain mixed metallic chloride salts and the like of the noble metals present which are then subjected to a ketonic solvent (which need not contain iodine) and the resultant mixture heated to remove excess ketonic material to leave an organic residue containing noble metal inner complex compounds which are acidified and heated to effect the decomposition thereof and the solvation of non-noble metal components, thereby leaving a residue of elemental noble metals.

The present invention relates to improvements over the advance in the state of the art disclosed in the said previously filed application.

It is an object of this new improved process to permit the dissolving and recovery of gold and platinum from substances known to contain such regardless of the state of the gold and platinum, their form or state of physical or chemical combination, or the nature of the medium containing the combined gold or platinum.

For instance the gold or platinum may be present as pure metals, either singularly or admixed with other metals or alloys. They may be either massive or finely divided; they may be physically uncombined or physically combined with metallic oxides such as rust, or they may be physically combined with alkali salts or embodied in organic matter such as in gums, resins, waxes, and the like. Or, the gold and platinum may be in chemical combination as with halogens or with sugars and glycosides, or in chelated forms, or as components of inner complex compounds of organic aldehydic and ketonic substances.

It is another object of the improved process disclosed in this specification to permit the presence of more than just trace amounts of uncombined water and to permit the dissolution of noble metals when the proportion of uncombined water present in the system under processing is as much as 15% of total weight of the system inclusive of the solvent weight.

It is noted particularly that elemental iodine was the sole source of the iodine disclosed in the previously filed application. It is an object of this invention to introduce in addition to the elemental iodine small amounts of metal iodide salts such as, for example, potassium iodide, ferrous iodide, and aluminum iodide among others.

Another object of this invention is to accelerate the rate of noble metal solution. Another object is to permit the dissolution of greater amounts of noble metals in less time than would ordinarily be expected.

Another most significant additional object of this invention is to permit the recovery of the noble metals without the necessity for evaporating the solvent, thus permitting re-use of solvent for further noble metal solvation.

Another object of this invention is to obtain the noble metal in the form of a film rather than in a fine state of division.

Another object of this invention is to obtain the noble compound with a high degree of ability to dissolve and hold in solution the iodide salts of the alkali metals while being freely miscible with water.

Further objects and aspects of the invention will become apparent in the following discussion.

In the preferred embodiment of this invention it is proposed to use preferably not more than 10% by weight of water based on the total weight of the system being processed including the solvent weight. This has the effect of expediting the dissolution of the noble metal by the solvent system. It has also been noted that unexpectedly the introduction of small amounts of metal iodide salts has the effect of greatly accelerating the rate of noble metal dissolution. Thus experiments in connection with this invention have shown that no more than 4% of the coarse particles of noble metals exposed can be dissolved in a dissolving medium consisting of 90 parts by volume of diacetone alcohol, 10 parts by volume of water, .5 part by weight of ferrous iodide ($FeI_2$) in the absence of any elemental iodine whatsoever. It was found that the introduction into a system such as described above of as little as .01% of elemental iodine based on the weight of the system permits dissolution of far greater amounts of the concerned noble metals in far less time than the same solution without the addition of elemental iodine. For example, a system composed of the same qualities and quantities of ingredients noted above but containing additionally 1 part by weight of the system of elemental iodine, dissolved 61% of the weight of coarse particles of gold exposed to such system during a time period of 1 hour.

One of the most significant additional improvements in the new process as compared with previously disclosed process resides in the manner in which the gold or platinum metal can be removed from the organic ketone-iodine-iodide solutions in which they have been dissolved. As described in the prior disclosure, the noble metals in the ketone solutions were to be freed of their contents of ketone compound by simple evaporation to leave a resinous residue that was then to be treated with concentrated sulfuric acid to free the noble metals from isolation and purification. In this improved process I propose that the noble metals can be displaced by exposing the noble metal pregnant solution to one of the non-noble metals such as silver, copper, iron, zinc, or aluminum. It would be possible to introduce any of the above-named non-noble metals in the form of powder, granules, wire, rod, sheet, or foil, or the like into the noble metal pregnant ketonic solution and then to heat same until the noble metals are displaced as such and are then to be found either adhering to the non-noble metal used or as a free metal on the bottom of the vessel employed. It has been found that it is possible to obtain the noble metal in the form of a film by using a non-noble metal sheet or foil. This is deemed preferable, inasmuch as the noble metal would be otherwise obtained in a fine state of division, such as occurs when powder or granular non-noble metals are employed. The use of aluminum metal in the practice of this invention is the preferred embodiment to be followed herein. It is believed that the following advantages are obtained through the use of aluminum instead of some of the other named, non-noble metals: Aluminum has a low molecular weight, its atomic weight of 26.98 being much lower than that of any of the other named non-noble metals, thus requiring far less quantity-wise for displacement. The salts of aluminum appear to hydrolyze to a greater degree than the salts of the other named metals. This appears to be a consequence of the higher valence of aluminum. Aluminum has a valence of three, and the electropositive character of metals decreases with increasing valency. At the same time it has been found that aluminum cannot assume the inner complex position nor the iodine replacement positions held by the noble metals as could silver or copper for example. This is probably due to the decrease of the electropositive character of aluminum. Additionally aluminum appears to have the highest capacity for reduction within the context of this process as compared with the other named non-noble metals. It is thought that this is probably due to the fact that the aluminum holds the highest position in the electromotive force series of all the named non-noble metals and thus has the lowest affinity for negative charges and the greatest tendency to discharge hydrogen ions. A most important unexpected advantage of the use of aluminum for the displacement part of this process is that aluminum iodide $AlI_3$ formed in this process does not sublime on heating as do the halide salts of the other named non-noble metals. This is thought to be due to the relatively high vapor pressure of aluminum iodide. Thus, any free iodine either as re-formed or as elemental iodine per se occluded in the noble metal deposit on the aluminum used can be removed by heating the noble metal coated alumnuim for sublimation of such iodine, without the decomposition or sublimation of aluminum iodide or re-formation of volatile gold or platinum halides to be lost otherwise by co-sublimation as could occur in the presence of other volatile non-noble metal halide salts. Also it has been found that aluminum iodide formed in the noble metal displacement reaction displays its simple molecular weight in the ketone solution and is thus incapable of causing polymerization or isomerization of the organic ketone. Other advantages of using aluminum instead of the other named non-noble metals include the fact that aluminum iodide is capable of tying large amounts of water in the formation of its hydrate such as $AlI_3 \cdot 6H_2O$ and $AlI_3 \cdot 15H_2O$ as examples. In addition, aluminum metal is readily available in almost any shape and form desired at reasonable cost in comparison with the other named non-noble metals.

Of almost equal importance in this new improved process—in addition to its enabling the removal of noble metals directly from their solutions without evaporation of the ketone compound and resulting degradation of the resinous residue of noble metal content by the use of concentrated sulfuric acid—is the fact that the solvation capability of the noble metal-freed ketone iodine solution is not impaired by the displacement process. The solution as such is capable of further solvation merely by the introduction thereto of additional elemental iodine.

The process disclosed in application Ser. No. 727,666, filed on May 8, 1968, now Pat. 3,576,620, sets forth certain requirements as to the chemical structure and possession of functional groups of the liquid organic compounds and combinations thereof to permit their use in the solvation process. As set forth in that patent, the useful liquid organic compound should be selected from:

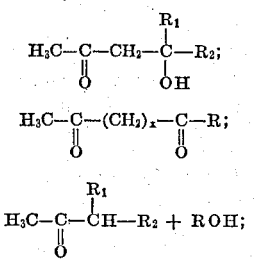

and admixtures thereof wherein $R$, $R_1$, and $R_2 = C_nH_{2n+1}$;
$x = 1$ or 2; and
$n =$ an integer from 1 to 3.

However, the use of diacetone alcohol (2-hydroxy-2-methyl-pentanone-4) is a preferred embodiment either used singularly or in combination with mesityl oxide (4-methyl-penten-3-one-2), an unsaturated ketone and a secondarily preferred embodiment of this improved process. Either diacetone alcohol or mesityl oxide are capable of dissolving the noble metals when such compounds contain dissolved iodine, but a diacetone alcohol-iodine-iodide combination has been found to be superior which is believed to be at least in part due to the ability of diacetone alcohol to dissolve and hold in solution iodide salts of alkali metals, while mesityl oxide is incapable of dissolving such iodide salts and likewise salts of other iodides which are dissolved by diacetone alcohol. Additionally, diacetone alcohol is freely miscible with water while mesityl oxide is not.

Of utmost importance to this process is the method whereby the solvation agent is prepared. Conventionally mesityl oxide is prepared by catalytically dehydrating diacetone alcohol by use of very small amounts of elemental iodine (usually about 0.1 gm. $I_2$ per 500 grams of diacetone alcohol) followed by heating to volatilize mesityl oxide which is condensed and collected as relatively pure mesityl oxide. It should be noted that the process of this invention wherein the use of diacetone alcohol, elemental iodine, iodide salts and heat are designated, there is no removal of the water of reaction. Thus in effect the processes not only result in obtaining systems containing excess diacetone alcohol, mesityl oxide and water, but also containing iodine compounds of both diacetone alcohol and mesityl oxide as well as products of hydrolysis of iodine, the formation of which are especially enhanced by the presence of alcohol groups and unsaturated organic compounds, all present in the system preferred for this process. For example:

(1) 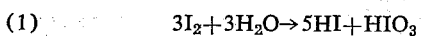

The products produced by the above reaction are known excellent noble metal solvents under proper conditions.

Experimental data show that the presence of the combination of iodine compounds of diacetone alcohol and mesityl oxide in addition to the products of hydrolysis of iodine, hydriodic acid and hypoiodous acid, all materially favor more rapid dissolution of noble metals as well as an increased rate of formation of the ketone-soluble noble metal-ketone addition products and noble metal inner complexes as a result of a complex series of reactions involving catalysis, oxidation, reduction, double decomposition, halogenation, dehalogenation, condensation, hydration, dehydration, sublimation, substitution, replacement, addition and complexing. Industrial grade diacetone alcohol was used in the preparation of the ketone-iodide solvent and showed a pH value of 6.3. The corresponding pH value of mesityl oxide measured 6.0. The addition of as little as 0.0025 grams of elemental iodine ($I_2$) to 100 ml. of each of the noted ketones changed the pH value of the diacetone alcohol to 2.3 while that of the mesityl oxide measured 0.5. The further addition to each of the ketone-iodine systems of 0.01 grams of potassium iodide resulted in further pH reduction to values of 1.9 and 0.2 respectively. When water was introduced into the ketone-iodine-iodide systems in an amount of 1% by volume, the measured pH of both systems was less than zero (0). Thus it can be seen that the named ketone-iodine-iodide-water system is strongly acidic in nature, while at the same time it possesses organic halogenate compounds, hydrogen iodide, elemental (dissolved) iodine, and organic acids all of which are known to exert dissolving action on the noble metals. Additionally the presence of water promotes acid catalyzed iodination and formation of hydriodic acid as is illustrated below:

(2)
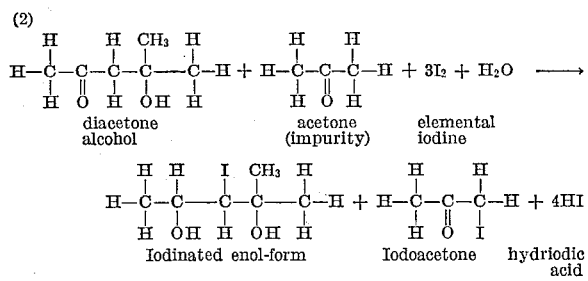

catalytic oxidation by the iodine of some enol-form diacetone alcohol produces some acetic acid and secondary alcohol, (3)
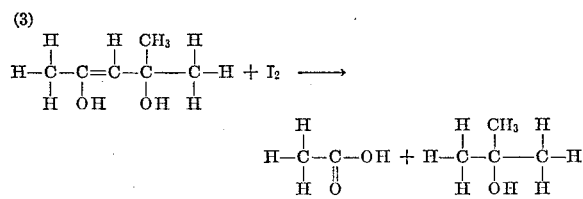

and catalytic condensation of diacetone alcohol to form some mesityl oxide, which in turn becomes iodinated occurs as follows, (4)
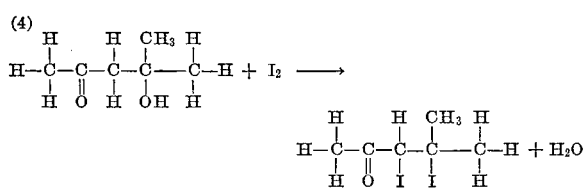

When noble metals are brought into contact with the products noted in the foregoing four equations they are solubilized to form the products noted below using gold as an example:

(5) $2Au + 2HI + 3I_2 \longrightarrow 2HAuI_4$ Iodoauric acid (6) $HAuI_4 \xrightarrow{\text{decomp.}} AuI_3 + HI$ (7) $AuI_3 \xrightarrow{\text{heat}} AuI + I_2$ The iodinated ketones react to form gold replacement products, (8)
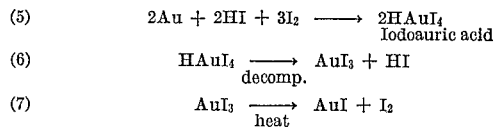

The aurous iodide (AuI) produced in equations 7 and 8 above is capable of reacting with mesityl oxide as shown below, (9)
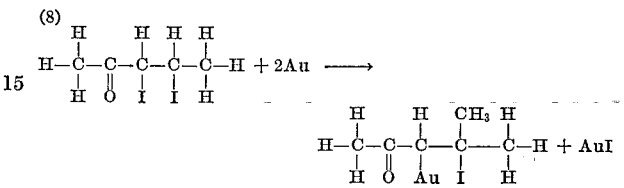

or to react with the keto form of the diacetone alcohol to form the 1-6 gold inner complex compound as shown below:

(10)
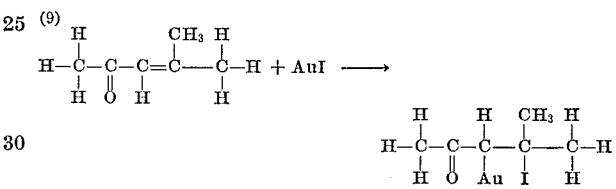

The unique composition of the solvation system described above is such that the system is almost as strongly acidic after the process of solvation is completed as was the system prior to introduction of noble metal. After solvation is essentially complete the system consists essentially of aurous organic iodinates and complexed gold compounds, aurous iodide, organic and inorganic acids, mesityl oxide and an unreacted excess of diacetone alcohol. Experimental studies showed a pregnant solution containing 1250 mgs. of dissolved platinum in 100 ml. of diacetone alcohol prepared to contain before use 2.0 grams of elemental iodine, 0.5 grams of ferrous iodide, and 5 ml. of water to have an electrometrically determined pH value of 0.9 where the measured pH of the described solution prior to introduction of the platinum was 1.3.

Further experiments have shown that the introduction of small amounts of acetic acid into the ketone-iodine-iodide-water systems used as the noble metal dissolution medium unexpectedly materially favored the acceleration of dissolution for example:

EXAMPLE I

A dissolving medium consisting of 90 mls. of diacetone alcohol, 10 ml. water, 0.25 ml. glacial acetic acid, 2 grams of elemental iodine and 0.5 grams of potassium iodide at a temperature of approximately 85° C. dissolved 1.0 gram of platinum metal (40 mesh U.S. Std. sieve sized) in a time period of 83 minutes. An identical system except that it contains no acetic acid required a time period of seven hours and twelve minutes to dissolve the same quality and quantity of platinum metal.

Additionally it was determined that the rate of noble metal dissolution increases with exposure of increased amounts of noble metals to the same qualities and quantities of dissolving medium. For example when 2.9357 grams of metallic gold was subjected to treatment, 527.8 mgs. were dissolved in a time period of 30 minutes, while when 0.5000 grams of the same quality and particle size gold was exposed to the same quality and quantity of dissolving medium as employed before a time period of two hours was required to dissolve 475.0 mgs. and further, when the particle size of the noble metals treated was decreased from a size of 40 mesh to a size of 200 mesh the dissolution rate was noted to increase by as much as 600%.

The dissolving rate is particularly sensitive to the effects of temperature. Thus, experimentation has shown that noble metals can be dissolved by the described dissolving medium at ambient temperatures but exposure of such to elevated temperatures near or approximating the boiling temperature of the dissolving liquid coupled with constant agitation of the material being exposed is preferred for obtaining maximum amounts of dissolved metals and minimum time periods. The iodine requirements appear to be directly related to the stoichiometric requirements of the total quantities of reactable metals present, both noble metals and non-noble metals if such be present. A slight excess, 10–20%, is favored while a larger excess is to be avoided inasmuch as more non-noble metal will be consumed in the displacement reaction since the total noble metal displacement requires the absence of the combination of elemental iodine and ionic iodine per se.

It is to be particularly noted that this improved process may also be employed for the isolation and recovery of the noble metals from their halogen salts whether they be as pure and singular noble metal salts, mixtures of such, or mixtures of both noble and non-noble metal salts. The concerned noble metal salt per se, or after being converted to such by conventional aqua regia processing or the like is treated with an excess of either diacetone alcohol or mesityl oxide, and the resultant mixture heated to dissolve the salt in the organic ketone. The resultant noble metal pregnant solution is then subjected to the noble metal displacement processing in the same manner as are the noble metal pregnant solutions obtained by processing with ketone-iodine-iodide-water systems (noted above) where the details of the noble metal displacement processing are fully described below.

For the displacement of the singular or mixed noble metals in their metallic states an excess of non-noble metal, preferably aluminum or zinc sheet or foil is placed in the noble metal pregnant solution and the solution moderately heated and kept heated until the cloudy solution becomes clear and transparent to indicate that the noble metal has been completely displaced. The solution can be heated to near boiling to accelerate displacement, but a more rapid, violent displacement leads to failure of the displaced noble metal to adhere to the displacement non-noble metal. However, it has been found that toward the end of the moderate heating cycle the temperature can be increased without causing the displaced noble metal to free itself from the non-noble metal and it has been found that under such conditions the noble metal will remain in foil or sheet form for easier separation from the noble metal free solution. In this displacement process it is neither necessary nor required that additional acid, either inorganic or organic, be introduced as the solution contains a most desirable level of hydrogen ions to allow an even and uniform reduction and displacement of the noble metals to take place. A summary of the principal reactions taking place in this displacement process is shown below using aluminum as the displacement metal and diacetone alcohol as the ketone compound present:

(11)

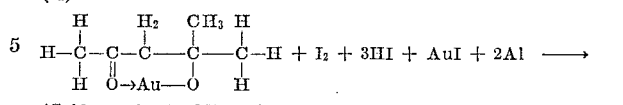

(Gold complex & additives)

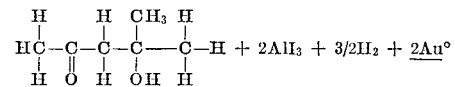

(12)

$3AuI_3 + 8H_2O + 5Al \longrightarrow$

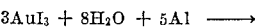 $2H_3AlO_3 + 4H_2 + (3AlI_3 + 2AuOH) + \underline{Au°}$

(13) $H_3AlO_3 + 3HI \longrightarrow AlI_3 + 3H_2O$

(14) $2AuOH + H_2 \longrightarrow 2H_2O + \underline{2Au°}$

(15) $2AuI + H_2 \longrightarrow 2HI + \underline{2Au°}$

In this connection it should be readily understood that a large excess of iodine in the dissolving medium will lead to the formation of a large excess of undesirable and unwanted aluminum iodide ($AlI_3$) or the iodide form of whatever other non-noble metal is present. However, as has already been pointed out, a small to moderate amount of non-noble metal iodide present in the dissolving medium favors increased noble metal dissolution thus eliminating addition of such iodide when the noble metal free ketone iodine solution is reused as a dissolving medium. With the reuse of the ketone-iodine solution freed of noble metal, hydrolysis of the aluminum iodide or other metal iodide present results in the formation of additional hydrogen iodide as follows:

(16) $AlI_3 + 3H_2O \rightarrow H_3AlO_3 + 3HI$ where the hydrogen iodide is available in the presence of iodine to react with metallic gold for the formation of auric iodide as is shown below:

(17) $2Au + 6HI \rightarrow 2AuI_3 + 3H_2$

The displaced noble metal or mixture of noble metals as the case may be present as free metal in the ketone-iodine system is found attached to the non-noble metal employed or as insoluble residue. It is then mechanically separated from the liquid and washed free of the ketone-iodine solution with some of the same iodine-free ketone compound as was originally employed in the solvation process. The washings are combined with the isolated ketone-iodine solution and reserved for reuse. The isolated solid matter is moderately heated to about 80° to 100° C. in temperature to volatilize residual ketone and cause the sublimation of any occluded elemental iodine which may be present. The dry elemental iodine-free solid residue is then treated with sufficient aqueous sodium hydroxide solution (5%–20% NaOH) and heated to boiling to convert the non-noble metal residue into its aluminate or zincate salts (depending upon which non-noble metal is used as displacement medium for the noble metal). The insoluble material is separated from the alkali solution mechanically and washed free of alkali salts with hot water after which it is digested with concentrated sulfuric acid to effect removal of any residual alkaline matter or organic alkali insoluble material and to dissolve other base metals such as silver, copper and zinc for example, which may have been present and displaced together with the noble metals. A mechanical separation of the insoluble residue from the sulfuric acid solution followed by washing of the isolated insoluble residue with water to remove excess acids and sulfate salts if present results in the recovery of the noble metals which were present in the original substance subjected to this processing. Due to the extreme variety of substances which may be processed for their contents of noble metals, in some cases, the recovered noble metals from use of the described process may require further processing to effect the desired degree of purification. If such be the case the recovered noble metals can be subjected to aqua regia treatment to convert them into their chloride salts after which these salts can be treated by the procedure covering recovery of noble metals from their halogen salts previously described. It is to be understood that the concerned process of necessity may have to be varied to some degree in its over-all use because of the extremely wide variety of noble metal-containing substances that can be subjected to processing, plus the fact that such substances will contain large variations in quantity of noble metal ranging all the way from very high noble metal alloys and noble metal salts through much lower noble metal content as in so-called high grade primary ores and downward in noble metal content as in secondary ores and even with very much lower noble metal contents as can be present in mineralized substances containing amounts expressed in fractions of troy ounces of noble metals per ton of mineral matter. However, the use of the disclosed process as will herein be described as the preferred process will serve in general for the purpose of dissolving, isolating, and recovering noble metals from the majority of substances known to contain such.

The substance to be processed for its content of noble metals is preferentially sub-divided to as great a degree as is possible by the use of whatever mechanical means may be required to do so without physical loss of the substance or loss by possible heat degradation or decomposition and attendant volatilization of noble metal-containing inorganic metal salts or noble metal organic compounds which may be driven out of the concerned substance by reason of the substance becoming unduly overheated. The noble metal-containing substance in its finest state of division is placed in a spherical container and brought into intimate contact with a solution consisting of a mixture predominantly a hydroxy ketone such as diacetone alcohol containing water, non-noble metal halide salts, and elemental iodine. The liquid-solids mixture, while being continually agitated mechanically is externally heated until its temperature is such as that near to or approximating the boiling point of the liquid portion of the mixture and is kept in this state until dissolution of the noble metals present is known to have taken place. Thereafter the liquid portion is mechanically separated from any insoluble matter which may be present and if such was present it is washed free of adherent noble metal pregnant liquid by washing it with small portions of mixture of the same kind of hydroxy ketone as originally used and water (ratio of approximately 4 to 1 by weight and preferably heated) with the washings being added to the main body of recovered noble metal pregnant liquid. A suitable container in which is present an amount of metallic aluminum foil or sheet known to be more than sufficient to displace the amounts of displaceable metals both noble and non-noble known to be present in the recovered liquid. The container with the noble metal pregnant liquid and aluminum is heated until the temperature of the solution is approximately 120° to 140° F. where it is held until the metal displacement reaction has been completed, or nearly completed depending upon whether the liquid portion is to be discarded or re-used. Upon completion, or near completion of metal displacement the solid matter is mechanically separated from the liquid matter and washed with small portions of the same kind of hydroxy ketone as was originally used to remove adhering liquid from the solid matter after which the resultant washings are added to the liquid portion if such is to be reserved for re-use in processing additional noble metal containing substances for their contents of noble metals. Otherwise, the washings may be discarded. The isolated solids containing the noble metals formerly present in the substances processed are moderately heated to about 100° to 110° F. to effect volatilization of residual hydroxy ketone used in the washing process and to cause sublimation of any occluded elemental iodine that may still be present. The dry elemental iodine-free solids are next treated with a small excess of aqueous sodium hydroxide solution (5 to 20% NaOH) to convert all of the known amount of aluminum metal present into its sodium aluminate salt. The insoluble solid matter remaining is mechanically separated from the alkaline solution which is discarded and the solid matter washed free of alkali and insoluble salts and then boiled with concentrated sulfuric acid to effect the dissolution of any alkali insoluble, non-noble metals which may also have been displaced from the noble metal pregnant solution and to degrade any occluded noble metal organic compound to effect liberation of their contents of noble metals. The resultant insoluble matter at this point is mechanically separated from the sulfuric acid, washed with water until it is free of acid and acidic soluble salts, then dried after which it is weighed and identified to be the noble metals recovered from the original noble metal containing substance exposed to treatment by the above described process. The recovered product may be examined by known methods of analysis to determine its degree of purity. In cases of the product being mixtures of noble metals or where a slightly impure singular noble metal is concerned, known purification processes can be employed to derive products of highest purity in singular noble metal content.

The following examples will serve to illustrate without limitation the use of this process for dissolving, isolating and recovering noble metals from some of the noble metal containing substances known from experimental study to be susceptible to processing by use of the process:

EXAMPLE II

A ten gram (10.00000) lot of metal known to be pure gold metal (99.99% Au) having a particle size approximating 0.001 inches was placed in a 150 ml. glass beaker. A solution consisting of 180 ml. of diacetone alcohol, 20 ml. of water, 0.1 ml. of glacial acetic acid, 0.5 grams of potassium iodide (KI), and 7.0 grams of elemental iodine ($I_2$) was placed in the beaker with the gold metal. The beaker and contents were heated to a temperature of approximately 190°–195° F. temperature and held at this temperature for a time period of two hours during which time the system was continuously agitated mechanically. At the termination of the two hour heating-agitating time period the liquid was separated from the insoluble solid residue by double filtration through a triple thickness of very fine pore filter paper. The insoluble particles (gold metal) on the filter paper were washed free of gold pregnant solution with approximately 180° F. temperature diacetone alcohol with the washings being combined with the main body of filtrate of gold pregnant solution. The filter paper containing the insoluble gold particles was gently ignited to destroy the filter paper and leave residual, insoluble gold metal particles having a weight of 1.63068 grams which chemical analysis showed to have a purity of 99.98% Au. A piece of aluminum metal foil having a weight of 0.5 grams was placed in a 250 ml. glass beaker to which was added the gold pregnant filtrate after which the beaker and contents were heated to approximately 125° F. temperature and held at this temperature until displacement of the gold appeared to be complete as indicated by loss of opaqueness and brownish-black color of the solution and the solution assuming a light cherry red color. The solution at this time was decanted to leave a solid residue of gold leaf approximately 0.005" in thickness which was washed free of the displacement solution with two-5 ml. portions of diacetone alcohol which were decanted and added to the original decantate and reserved for re-use. The thus isolated gold leaf was heated to a temperature of about 110° C. to volatilize adhering diacetone alcohol and to sublime occluded iodine after which the gold leaf was digested with 20 ml. of aqueous alkali solution (5% NaOH). The aqueous alkali was decanted from the gold leaf which was next washed free of alkali and alkali soluble matter by decantation with several portions of hot water. The gold leaf was then covered with concentrated sulfuric acid (98% $H_2SO_4$ by weight) and the combination heated to fumes of acid. After allowing the acid-gold leaf system to cool slightly the acid was decanted and the gold leaf was washed free of acid and acid soluble matter by decantation using several portions of hot water. The gold leaf was then dried and heated to a dull red heat after which it was cooled and weighed to show a weight of 8.36921 grams whose chemical analysis showed to have a purity of 99.97% gold as Au.

EXAMPLE III

One-tenth gram (0.1) of elemental iodine ($I_2$) was dissolved in the diacetone alcohol solution obtained by decantation as noted in Example II, above wherein such solution resulted from displacement by metallic aluminum foil of the gold formerly contained in the gold pregnant solution of the process. This solution, approximately 234 ml. in volume was added to 592 grams of a primary ore of gold previously comminuted to a particle size of minus 300 mesh (U.S. Std. Sieve) and contained in a liter beaker. This ore by chemical analysis showed a content of 18.2 troy ounces of gold per ton of ore and 0.42 troy ounces of platinum per ton of ore. The liquid-solid mixture heated to and maintained at a temperature of approximately 160° F. was continuously agitated mechanically for a time period of 30 minutes after which it was filtered while still hot using suction filtration through a fine pore glass fiber filter medium. The insoluble solids were discarded while the filtrate and washings were transferred to a 400 ml. glass beaker containing a piece of aluminum metal foil weighing 0.34 grams. The noble metal-pregnant filtrate and aluminum metal foil were kept at a temperature of approximately 120° F. until it was evident from the color and appearance of the solution (free of cloudiness) that the displacement reaction was complete or nearly so at which time the temperature was increased to about 200° F. and held at this level for a time period of about five minutes to assure completion of the displacement reaction. The liquid portion was then decanted and the insoluble solid residue washed free of displacement solution with diacetone alcohol after which the solid residue was heated to a temperature of about 100° C. to the absence of diacetone alcohol and elemental iodine ($I_2$) as evidenced by the absence of colored vapors of iodine sublimate. The diacetone alcohol-elemental iodine-free solid residue was next treated with about 20 ml. of aqueous alkali solution (5% NaOH), followed by boiling, cooling, decantation of the alkaline solution, and washing of the insoluble solid residue with water until free of alkali and alkali salts. Ten (10) ml. of concentrated sulfuric acid (98% $H_2SO_4$) were added to the alkali insoluble solid residue and the mixture heated to near fuming after which the liquid (acid) portion was decanted and the acid insoluble residue washed by decantation with several portions of hot water until free of acid and acid soluble matter. The resultant acid insoluble solid residue was dried, heated to dull red heat, cooled, and weighed to show weight of 373.6 mgs. having a chemical analysis as follows: 97.19% Au, 2.15% Pt, 0.26% other platinum group metals, and 0.41% non-noble metal impurities.

EXAMPLE IV 2962 grams of approximately 200 mesh sized (obtained from careful pulverization to prevent overheating) carbonaceous mineral substance known by qualitative chemical evaluation to contain gold of an indeterminate quantity by use of fire assay methods of analysis were combined with one liter of a solution consisting of 800 ml. of diacetone alcohol, 50 ml. of mesityl oxide, 150 ml. of water, 1 ml. of glacial acetic acid, and 0.1 gram of elemental iodine ($I_2$). This liquid-solid mixture, while being continuously agitated mechanically was kept at a temperature of approximately 180° F. for a time period of fifteen minutes after which it was filtered through fine pore glass fiber by use of suction filtration. The insoluble solids on the filter were washed with two separate portions of a hot mixture of 50 ml. of diacetone alcohol and 100 ml. of water per each portion used. The filtrate and washings in the presence of a piece of aluminum metal foil weighing 0.17 grams were heated to a temperature of about 100° F. and held at this temperature for a time period of two hours after which time period the aluminum metal foil with plating was removed from the solution. The plated aluminum foil was treated in the same general manner with diacetone alcohol, alkali, acid, etc. as cited in the preceding examples to give a recovered product having a weight of 66.1 mgs. having a chemical composition by analysis as follows: 99.14% gold as Au and 0.86% unidentified impurities. This amount of recovered gold metal indicates the mineralized substance processed would represent an ore having a content of 0.655 troy ounces of gold per ton.

EXAMPLE V

One lot of 1.50 troy ounces of precious metal scrap after being reduced in size to particles of less than 0.01 inches in overall dimensions and thoroughly mixed was divided into three portions with each portion consisting of 15.55000 grams. Chemical analysis of one of the three portions showed the scrap to consist of the following: gold metal—Au—77.41%, platinum metal—Pt—4.46%, palladium metal—Pd—4.83%, iridium metal—Ir—0.52%, silver metal—Ag—9.27%, and non-noble metals—3.51%. Of the remaining two portions one was treated with aqua regia to convert its metal content into chloride salts while the third portion was dissolved in a solution consisting of 450 ml. of a mixture of equal volumes of diacetone alcohol and mesityl oxide and 50 ml. of water containing 1 gram of cuprous iodide (CuI) and 12 grams of elemental iodine ($I_2$). After removal of the insoluble matter including insoluble silver chloride from the aqua regia-dissolved-precious metal portion the remaining soluble noble metal salts were dissolved in 200 ml. of diacetone alcohol. Aluminum foil was introduced into each of the two separately derived organic solutions of halogenated noble metals from which their contents of noble metals were displaced followed by subsequent treatment of the displaced metals by ketone washing, heating, alkali and acid processing etc. treatment as described in prior examples to result in the separate and individual recovery of the noble metals as previously contained in each of the two portions of precious metal scrap processed with such recovered noble metals being in the form of foil. The weight of recovered noble metal foil from the aqua regia conversion-diacetone alcohol processing was 13.55230 grams. A chemical analysis showed the recovered product to contain the following: Gold as Au—88.82%, platinum as Pt—5.03%, palladium as Pd—5.54%, and iridium as Ir—0.60%. The weight of noble metal foil recovered from the mixed ketone-halogen salt-iodine processing was 13.54670 grams. Chemical analysis of this product showed it to contain the following: Gold as Au—88.86%, platinum as Pt—5.10%, palladium as Pd—5.66%, and iridium as Ir—0.59%.

Further experimental studies have disclosed that the halogens, chlorine and bromine with or without the presence of their non-noble metal salts can likewise be employed in this new improved process, however, with far less over-all efficiency in contrast with the use of iodine with or without the presence of non-noble metal iodide salts. Also, mixtures of iodine, bromine and chlorine or any two thereof can be used in the present process. With the use of chlorine or bromine with or without the presence of their non-noble metal salts, the degree of noble metal solvation is both considerably poorer and much slower with several undesirable side reactions taking place. Because of their physical states chlorine and bromine also present difficult handling problems in addition to presenting use hazards relative to their toxicity. And thus for these reasons in addition to numerous others the use of iodine with or without the presence of non-noble metal iodide salts is a preferred embodiment of this process. In general the over-all nature of the substances to be processed must be taken into consideration in using this process. That is, their chemical composition relative to contents of both noble and non-noble metals; their characters relative to contents of free and combined water and acid or base forming ingredients; the nature and amounts of organic matter contained, and similar factors all must be related to the amounts to be used of the named chemicals specified for the process. The amounts are readily determinable usually by subjecting a representative amount of any concerned substance to a small scale processing first. In any event as long as the specific chemicals named are employed in the fashion as described in general, any substance known to contain noble metals will be acted upon with the noble metals being dissolvable and recoverable by the described process.

What is claimed as new is as follows:

1. A composition of matter suitable for separating and recovering noble metals from substances containing said noble metals by forming a noble metal pregnant solution comprising dissolved internally complexed ketonic-noble metal compounds and an insoluble residue substantially free of noble metal which comprises:

(a) a ketonic solvent selected from the group consisting of

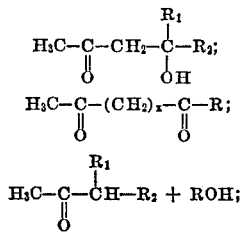

and admixtures thereof wherein

R, $R_1$, and $R_2 = C_nH_{2n+1}$, $x = 1$ or 2, and $n =$ an integer of from 1 to 3 inclusive, (b) elemental halogen dissolved in said solvent in a quantity at least about 0.003% but not more than 120% of the quantity stoichiometrically necessary to react all the reactable metals in the system, the said elemental halogen selected from the group consisting of iodine, bromine, chlorine and admixtures thereof, (c) at least about 0.01% by weight of dissolved metal iodide salts, and (d) more than trace amounts, but not more than 15% by weight, water.

2. The composition of claim 1 containing dissolved, internally complexed ketonic-noble metal compounds.

3. The composition of claim 1 wherein the ketonic solvent is selected from the group consisting of diacetone alcohol, mesityl oxide, or admixtures thereof.

4. The composition of claim 1, wherein the elemental halogen is iodine.

5. The composition of claim 1 wherein the metal iodide salt is an alkali metal iodide salt.

6. The composition of claim 5 wherein the metal iodide salt is potassium iodide.

7. The composition of claim 1 additionally including at least about 50% by weight acetic acid, based on the weight of said salt.

8. The composition of claim 7 wherein said solvent contains about 0.3% acetic acid, based on the weight of said solvent composition.

9. The composition of claim 7 containing dissolved internally complexed ketonic-noble metal compounds.

References Cited

UNITED STATES PATENTS

| | | | |
|---|---|---|---|
| 2,863,761 | 12/1958 | Ashley et al. | 75—109 |
| 861,535 | 7/1907 | Pritchard | 75—118 |
| 2,304,823 | 12/1942 | Harrison | 75—108 |
| 2,829,967 | 4/1959 | Schlecht | 75—114 |
| 2,863,761 | 12/1958 | Ashley et al. | 75—108 |
| 3,018,176 | 1/1962 | Zima | 75—118 |
| 3,022,145 | 2/1962 | Zima | 75—121 |
| 3,476,551 | 11/1969 | Lowenheim | 75—121 |
| 3,576,620 | 4/1971 | Wilson | 75—121 |

CARL D. QUARFORTH, Primary Examiner

I. GLUCK, Assistant Examiner

U.S. Cl. X.R.

75—101 R, 102, 114, 118, 121; 252—364; 260—429 J, 430